May 12, 1925.
L. P. LANSING
1,537,316
FLUID ACTUATING MECHANISM FOR BRAKES
Filed March 3, 1923    2 Sheets-Sheet 1
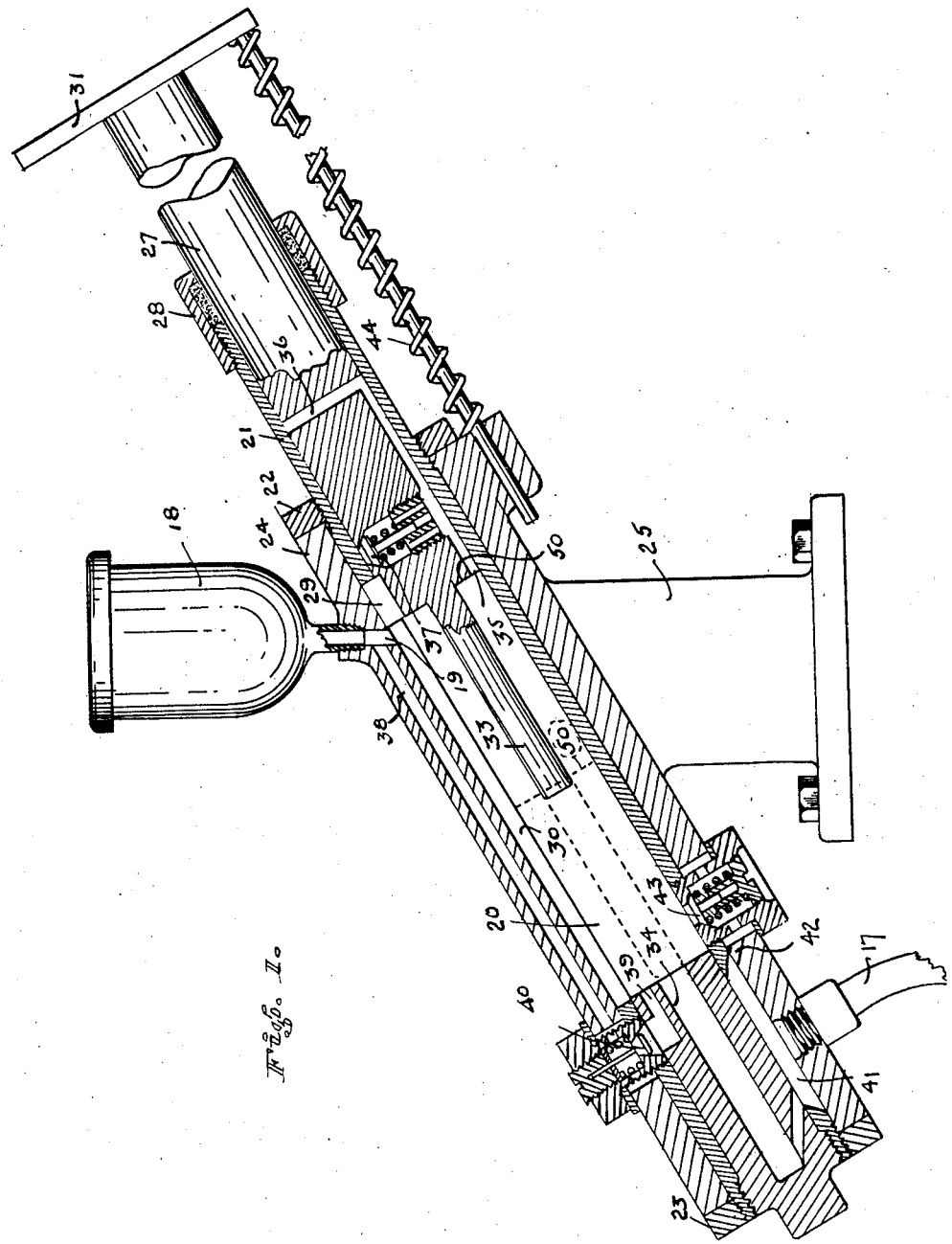

May 12, 1925.
L. P. LANSING
1,537,316
FLUID ACTUATING MECHANISM FOR BRAKES
Filed March 3, 1923     2 Sheets-Sheet 2
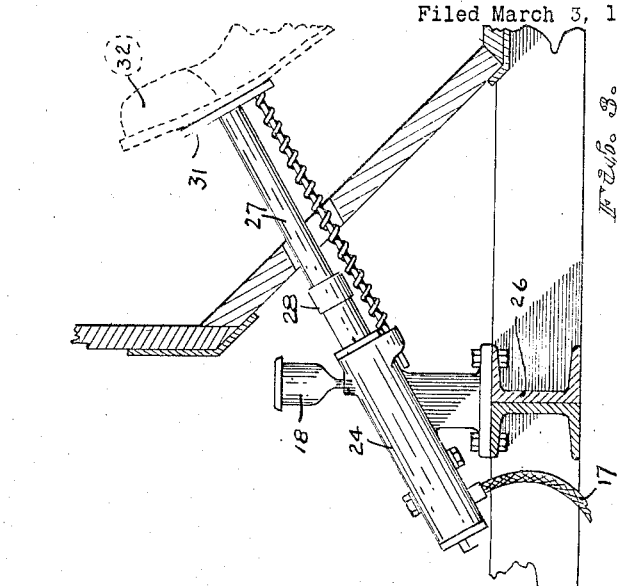
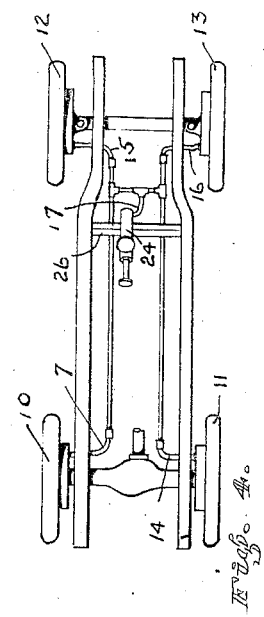
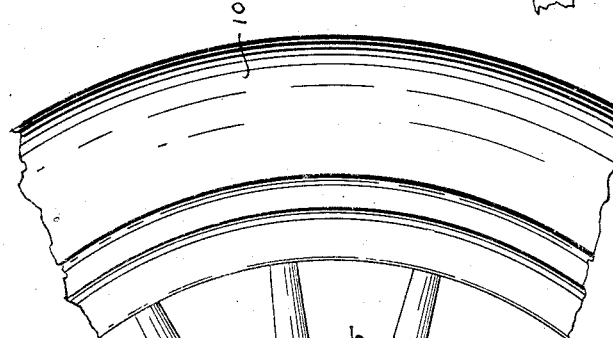
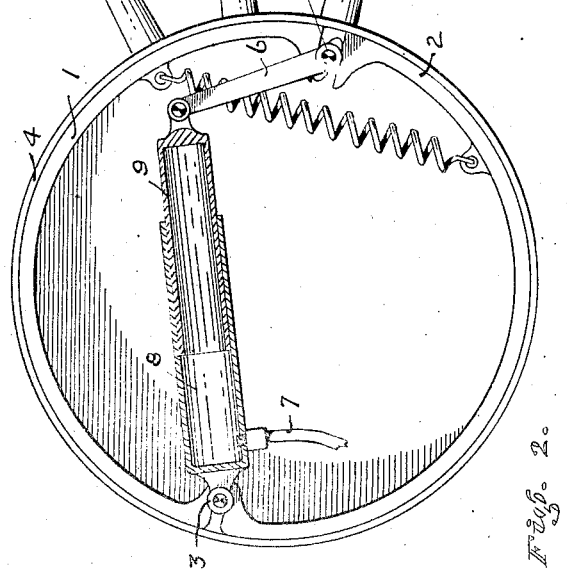

Patented May 12, 1925.

1,537,316

UNITED STATES PATENT OFFICE.

LOUIS P. LANSING, OF SAN FRANCISCO, CALIFORNIA, ASSIGNOR OF ONE-HALF TO HAROLD N. OTTO, OF SAN FRANCISCO, CALIFORNIA.

FLUID-ACTUATING MECHANISM FOR BRAKES.

Application filed March 3, 1923. Serial No. 622,557.

*To all whom it may concern:*

Be it known that I, LOUIS P. LANSING, a citizen of the United States, and resident of the city and county of San Francisco, State of California, have invented new and useful Improvements in Fluid-Actuating Mechanism for Brakes, of which the following is a specification.

My invention has for its object means and mechanism for actuating a plurality of brakes from a cylinder and piston adapted to be actuated from a single source of pressure established by the operator, and is particularly adapted to operating brakes of motor vehicles and the like.

Further objects are, the creation of consecutively higher pressures during a single operative movement of the pressure creating device; means for equalizing the pressure applied to the plurality of braking members; the adaption of the brakes to the front wheels of motor vehicles, as well as to the rear wheels; also the automatic establishment and maintenance of a full fluid charge in the system; the free return of the plunger on the release of the operating pressure; the quick and accurate response of the braking members because of a plurality of different pressures available during the operating stroke.

These objects I accomplish by providing a plunger and cylinder adapted to be actuated by the operator whereby a fluid pressure is created. This fluid is transmitted through suitable pipe connections to the several brake members and I prefer to employ a short length of flexible pipe adjacent each of the vehicle wheels whereby relative movement between the axle and the body of the vehicle and about the pivots for the front wheels is readily accomplished.

Pressure for operating my system is established by a piston of two diameters operating within a cylinder having two corresponding diameters, whereby a larger diameter of cylinder and piston establish the first pressure applied to the braking system, after which the smaller diameter piston and cylinder come into action to create an increased pressure applied to the brakes at the time that greatest braking effort is desired. In this way I accomplish a relatively rapid low pressure long stroke of the braking members followed by a greatly increased pressure and relatively short stroke during the latter part of movement of the piston.

By referring to the accompanying drawings my invention will be made clear.

Fig. 1 illustrates the cylinder and other associate parts and valves for creating the operating pressure.

Fig. 2 shows in detail the braking mechanism of one of the wheels with the operating cylinder in section.

Fig. 3 shows the arrangement of the piston and cylinder adapted to the ordinary automobile, a portion of the frame and floor parts adjacent to the operator's seat, and the operator's foot shown dotted in.

Fig. 4 is a plan view of an automobile chassis showing the assembled parts with my invention applied to all four wheels.

Throughout the figures similar numerals refer to identical parts.

The wheels are each equipped with brake bands, 1; 2, pivoted at 3 and adapted to be spread against the brake drum 4 by the double arm 5 actuated by the lever 6 in conventional manner. In my invention the lever 6 is operated by introducing pressure through the flexible connections 17—7 into the cylinder 8, whereupon the piston 9 forces the lever 6 outward and through the lever action at 5 spreads the bands 1 and 2 against the drum 4 braking the wheel 10; and is to be understood that the other wheels 11, 12, and 13 are equipped with similar brake mechanism. The cylinders and pistons of each of these being actuated by pressure introduced through the flexible pipes 17 and 7, 14, 15, and 16 communicating in parallel with the pressure supply pipe 17 which in turn receives its pressure control from the mechanism shown in detail in Fig. 1 wherein an oil supply is shown in the cup 18 having a gravity communication through the channel 19 with the cylinder 21, which I prefer to make of brass or bronze, having a thread and nut at 22 and at 23 whereby it is rigidly secured in place within the casting 24. This casting is supported from the foot 25 adapted to be mounted upon some rigid portion of the automobile chassis 26.

Mounted to move freely within the cylinder 21 is the piston 27 working through the packing gland 28 and having in its inner end a key 29 adapted to travel in a slot 30 whereby the piston is enabled to make its full stroke from the full line position of Fig. 1 in a left handed downwardly direction when the foot plate 31 is depressed by the operator's foot 32 as shown in Fig. 3.

The lower end of the piston 27 is turned to a smaller diameter at 33 being preferably ground to fit the carefully ground or reamed smaller cylinder at 34.

Passageways 35 and 36 are provided through the piston 27 and a connecting branch in which is the one way valve 37 opening from the passage 30 for certain piston positions as described elsewhere. An auxiliary pasageway is shown at 38, 39, under the control of the one-way valve 40, and a connecting hole 42 from the fluid outlet 41 and controlled by the one-way valve 43, enables a by-pass communication from the cylinder chamber 20 to the smaller cylinder 34.

As the piston is advanced to its dotted position 50 the key 29 slides in the channel 30 and the passage 36 opens into the channel 30 and thence to the supply in 18. Further movement of the piston now forces the trapped oil in 20 into the reservoir 18. On the return movement to prevent the piston being restrained by any possible vacuum in 20 the valve 37 will freely admit oil from 18 through 35 and into the space 20.

During the return movement of the piston 33 from the cylinder 34 oil may flow freely from 20 by the one way valve 43 and into 34.

At 44 is a spring for returning the foot member 31 and piston 27 to the full line position of Fig. 1 after they have been depressed by the operator's foot 32.

The operation is as follows:

Assuming the parts to be in the position shown in Figs. 1, 2, 3, 4, and the cup 18 supplied with oil. The chambers 20 and 34, the pipes 17, 7, and 14, 15, 16, and the cylinders 8 will all be full of oil and the body of oil at 18 will freely communicate by gravity through the passage 19 with the said oil charge. If now the operator desires to put on the brakes he depresses the foot member 31 whereupon the oil contained in the cylinder 20 under the pressure exerted against the opposing area of the piston 27 establishes sufficient pressure through the pipe 17 to actuate the cylinders and pistons 8, 9, and apply the brake shoes 1 and 2 against the drums 4 of the wheels 10, 11, 12, 13. As the operator further depresses the foot plate 31 the reduced piston 33 enters the reduced cylinder 34 and at this moment the oil communication between the cylinder space 20 and pipe 17 is cut off and the smaller piston and cylinder under the same foot pressure causes an increased unit pressure within the pipe 17, and therefore an increased braking effort against the brake shoes 1 and 2 of all of the wheels.

To prevent the locking of the piston 27 due to the oil body entrapped at 20 between the end of the piston when in the dotted position at 50, and locking the piston against further movement, the passage 35, 36, is at such time adapted to commence to register with the keyway 30 so that communication is now open between the otherwise trapped oil and the cup 18, and oil flows freely thereinto from the remaining portion 20 of the larger cylinder.

Upon the return stroke under the action of the spring 44 when the foot pressure against 31 is released the vacuum which would otherwise be caused in this trapped area 20 of the cylinder and retard or prevent the said return movement, is avoided by the oil flowing freely through the channels 35, 36, from the supply 18, until 36 arrives at the end of the keyway 30 when during the last instant of movement the valve 37 opens to admit the latter portion of oil into said trapped area.

Instead of utilizing the valve 37 and channels 35, 36, the valve 40 in passageway 38, 39, may be employed. The valve 43 controlling the communication between 41 and 20 is to take care of that portion of the piston stroke when the hole 36 is covered against the cylinder wall and communication with the key-way 30 is cut off; the oil at such time trapped in the remaining portion 20 of the cylinder will pass by the said one-way valve and through the channel 42 into port 41 under the action of the full diameter of the piston 27 until the reduced piston 33 has fairly entered the cylinder 34, or until hole 36 has registered with keyway 30, after which valve 43 closes and the higher pressure is transmitted through pipe 17.

I claim:

1. Fluid brake actuating mechanism, comprising a plurality of pressure-fluid-operable brake actuating devices, a pressure supply cylinder of two diameters and a piston of two diameters in said cylinder, means for advancing the piston in the cylinder by the operator and a fluid supply chamber having a port communicating with the cylinder, said port being closed by the piston when the piston is advanced and uncovered when the piston is withdrawn, and connections between said pressure supply cylinder and said devices, a one way valve to relieve the fluid otherwise trapped when the smaller piston and cylinder are functioning.

2. Fluid brake actuating mechanism, comprising a plurality of pressure-fluid-operable brake actuating devices, a pressure supply cylinder of two diameters and a piston of two diameters in said cylinder, means for advancing the piston in the cylinder by the operator and a fluid supply chamber having a port communicating with the cylinder, said port being closed by the piston when the piston is advanced and uncovered when the piston is withdrawn, and connections between said pressure supply cylinder and said devices, a one way valve to relieve the fluid otherwise trapped when the smaller piston and cylinder are functioning and another one way valve admitting fluid from the said chamber to the larger cylinder as the piston is withdrawn.

3. Fluid brake actuating mechanism, comprising a plurality of pressure-fluid-operable brake actuating devices, a pressure supply cylinder of two diameters and a piston of two diameters in said cylinder, means for advancing the piston in the cylinder by the operator and a fluid supply chamber having a port communicating with the cylinder, said port being closed by the piston when the piston is advanced and uncovered when the piston is withdrawn, and connections between said pressure supply cylinder and said devices, a one way valve to relieve the fluid otherwise trapped when the smaller piston and cylinder are functioning and a port from the larger cylinder adapted to register with a passage to said chamber when the smaller piston and cylinder are functioning, and a one way valve to relieve the fluid otherwise trapped when the smaller piston and smaller cylinder are functioning.

LOUIS P. LANSING.